W. H. SMITH.
LUBRICATING VALVE FOR FUEL OIL TANKS.
APPLICATION FILED DEC. 31, 1910.

1,100,787.

Patented June 23, 1914.

WITNESSES:
Brennan B. West.
Harold E. Smith.

INVENTOR,
William H. Smith
BY J. B. Hull
ATTY.

UNITED STATES PATENT OFFICE.

WILLIAM H. SMITH, OF CLEVELAND, OHIO, ASSIGNOR TO CLEVELAND BRONZE AND BRASS WORKS, OF CLEVELAND, OHIO, A PARTNERSHIP CONSISTING OF WILLIAM H. SMITH AND MICHAEL F. BARRETT.

LUBRICATING-VALVE FOR FUEL-OIL TANKS.

1,100,787. Specification of Letters Patent. Patented June 23, 1914.

Application filed December 31, 1910. Serial No. 600,355.

*To all whom it may concern:*

Be it known that I, WILLIAM H. SMITH, a citizen of the United States, residing at Cleveland, in the county of Cuyahoga and State of Ohio, have invented a certain new and useful Improvement in Lubricating-Valves for Fuel-Oil Tanks, of which the following is a full, clear, and exact description, reference being had to the accompanying drawings.

This invention relates to valves, and has for its particular object the provision of a valve or cock of the turning-plug type that shall be particularly suitable for use in connection with gasolene tanks. This particular suitability is attained by reason of a continuous supply to the operating parts of the valve of a lubricating fluid of greater consistency and specific gravity than the gasolene whereby the leakage of the gasolene around the valve surfaces will be impeded and whereby such gasolene as may escape will be floated into a chamber or reservoir prepared for its reception and prevented from dripping from the valve in an unpleasant and dangerous manner. The means whereby these objects are attained together with other features of construction and operation of my improved valve constitute the present invention.

One embodiment of my invention is illustrated in the accompanying drawing in which—

Figure 1:
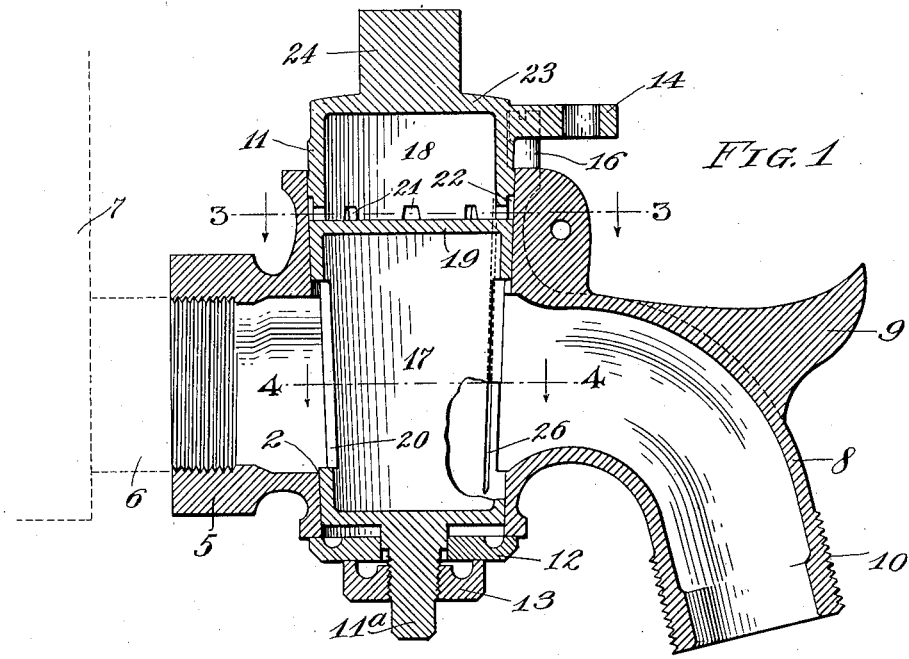
Figure 2:
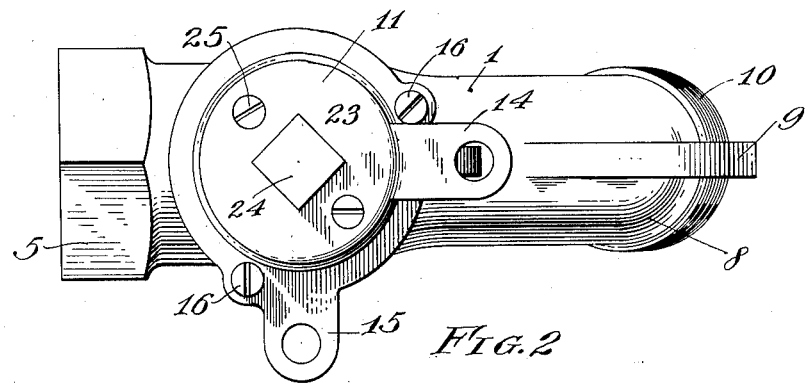
Figure 3:
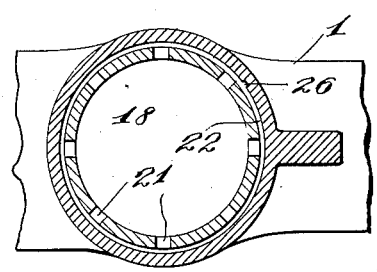
Figure 4:
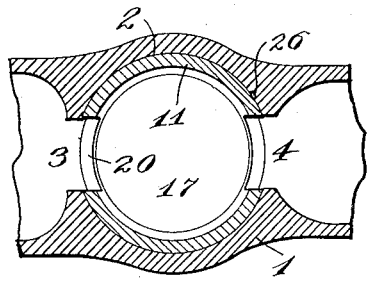

Figure 1 is a vertical cross-sectional view of my improved valve showing it in connection with a gasolene tank; Fig. 2 is a plan view of the valve; Fig. 3 is a cross-sectional view taken upon the dotted line 3—3 in Fig. 1; and Fig. 4 a cross-sectional view of the valve taken on the line 4—4 in Fig. 1.

Describing the parts by reference characters, the body of the valve is shown at 1 and comprises a casing having a vertically arranged conical plug seat 2, provided with suitable inlet and outlet ports 3 and 4, a threaded socket 5 by means of which it may be attached to the outlet pipe or nipple 6 of a gasolene tank 7, and a downwardly directed discharge spout 8, which may be provided with a lug 9 to hold a pail. The outer surface of this spout is provided with threads 10 for receiving a cap, (not shown) or a discharge conduit (not shown). A turning plug 11 is fitted in the seat 2 and accurately ground therein, and is rotatably retained in place by means of a washer 12 and nut 13 carried upon a threaded boss 11ª formed on the end of the plug in the usual manner. The washer 12 should make a tight joint with the boss and with the casing. A perforated lug 14 is formed on the plug and is adapted to register with a similar lug 15 carried by the casing to permit locking of the valve. Stop pins 16 are also carried by the casing and coöperate with the lug 14 to limit the turning movement of the valve to substantially 90 degrees. The interior of the plug is made hollow and is divided into two chambers 17 and 18 by a transverse web 19. The walls of the lower chamber 17 are provided with perforations 20 for the passage of fluid in the usual manner. The walls of the upper chamber 18 are formed with perforations 21 just above the web 19, and the exterior of the plug is formed with a circumferential groove 22 in communication with these perforations. This chamber is closed at its top by means of a plate 23 having an angular boss 24 for a wrench or handle and is also provided with threaded openings adapted to be closed by screw-plugs 25.

A vertical groove 26 is formed in the plug seat at one side of the outlet opening and communicates at its upper end with the groove 22 and extends at its lower end to a point somewhat below the outlet port 4. This groove is formed in the wall of the casing which is opposite the lug 15 and is never in communication with the interior of the plug since the stop pins 16 prevent the ports 20 from coming into register therewith.

In use the chamber 18 is filled with lubricating oil through one of the holes in its top, the screw plugs 25 being removed to permit entrance of oil and exit of air. This oil works down the groove 26 and, by the operation of the plug, is spread out between the surfaces of the plug and seat. Its consistency will greatly retard the leakage of gasolene between these surfaces, as well as facilitating the turning of the valve. What little gasolene does escape will be buoyed up by the heavier lubricating oil and will work up into the groove 22 and thence into the chamber 18. This action may continue until the lubricating oil in that chamber is entirely replaced by gasolene, which fact will be announced by an increased difficulty in turning the valve, owing to the poor lubricating qualities of gasolene, and by the increase in leakage of gasolene around the valve. The plugs 25 are now again removed and lubricating oil supplied through one opening while the gasolene escapes through the other. This operation can be carried on without danger, since suitable precautions can be taken against fire at this time, whereas, in other valves not provided with my oil sealing and gasolene impounding means, the danger of fire is always present. Leakage of the gasolene, or other light liquid, from the smaller end of the plug is prevented by the heavier oil which tends to collect in the space defined by the bottom of the plug 11 and top of the washer 12. The consistency of this oil is sufficiently great to prevent its oozing out around the washer 12 and its specific gravity is sufficiently high to hold the gasolene up away from this point. It will be noted, however, that this valve is suited for use with any light liquid as well as for gasolene, such, for example, as alcohol; and that the chamber 18 instead of being filled with a lubricating oil, may be filled with any other comparatively heavy liquid, such as water, and a part of the advantages of my device would still be retained.

Having thus described my invention, what I claim is:—

The method of preventing the dripping of light and volatile liquids from the plug of a turning plug stop cock which consists in forming an annular groove between said plug and its seat at a point above the liquid passageway and providing a chamber above said groove and in communication therewith, and filling said chamber and groove with an oleaginous liquid of greater specific gravity than the liquid passing through the stop cock whereby said oleaginous liquid will become spread over the engaging surfaces of the plug and seat and will buoy up any of the lighter liquid which may penetrate therebetween and impound the same in said chamber.

In testimony whereof, I hereunto affix my signature in the presence of two witnesses.

WILLIAM H. SMITH.

Witnesses:
  HAROLD E. SMITH,
  BRENNAN B. WEST.